US005378301A

United States Patent [19]

Boreali et al.

[11] Patent Number: 5,378,301

[45] Date of Patent: Jan. 3, 1995

[54] LINERLESS LABEL DISPENSING

[75] Inventors: Jeffrey J. Boreali, North Tonawanda; John C. Bane, Grand Island, both of N.Y.

[73] Assignee: Moore Business Forms, Inc., Grand Island, N.Y.

[21] Appl. No.: 181,920

[22] Filed: Jan. 18, 1994

[51] Int. Cl.$^6$ .................. B32B 35/00

[52] U.S. Cl. .................. 156/344; 156/577; 156/584; 206/409; 221/73

[58] Field of Search .................. 156/584, 577, 344; 221/73; 206/409

[56] References Cited

U.S. PATENT DOCUMENTS

| | | | |
|---|---|---|---|
| 2,276,296 | 3/1942 | Flood | 221/73 |
| 2,372,245 | 3/1945 | Avery . | |
| 2,912,140 | 11/1959 | Cole | 221/70 |
| 3,231,130 | 1/1966 | Foote . | |
| 3,312,005 | 4/1967 | McElroy . | |
| 3,554,847 | 1/1971 | Broemmlsiek | 156/584 |
| 3,698,600 | 10/1972 | Foote | 221/73 X |
| 3,743,086 | 7/1973 | Alrich . | |
| 4,291,802 | 9/1981 | Buelens | 206/409 |
| 4,294,357 | 10/1981 | Stevens et al. . | |
| 4,306,687 | 12/1981 | Hadtke | 206/409 X |
| 4,467,974 | 8/1984 | Crim . | |
| 4,772,355 | 9/1988 | Leahy . | |
| 4,821,918 | 4/1989 | Turner . | |
| 4,824,517 | 4/1989 | Leahy | 156/584 |
| 4,830,183 | 5/1989 | Metters . | |
| 4,865,196 | 9/1989 | Buelens et al. | 206/409 |
| 4,954,210 | 4/1990 | Desmond . | |
| 5,246,022 | 9/1993 | Israel et al. | 206/409 X |

FOREIGN PATENT DOCUMENTS

| | | |
|---|---|---|
| 614575 | 2/1961 | Canada . |

*Primary Examiner*—Mark A. Osele
*Attorney, Agent, or Firm*—Nixon & Vanderhye

[57] ABSTRACT

A dispenser dispenses linerless labels in a web from a roll. The dispenser includes a housing with a shaft in the housing for receipt of the core of a roll of labels mounting them for rotation about an axis. First and second substantially planar guide surfaces guide movement of the labels away from the shaft in a plane substantially parallel to a plane containing the axis of rotation, and first and second rollers are mounted at the end of the guide surfaces for rotation about axes parallel to the axis of rotation of the roll. Each roller may comprise a stationary rod with a freewheeling tube over the rod. The labels are maintained taut during dispensing to assist the process of one label being stripped from another. The dispenser is used in a method of dispensing linerless quadrate pressure sensitive adhesive labels by pulling the labels between the rollers and alternately breaking them over the first roller, and then the second roller, to strip each label from its trailing label.

21 Claims, 4 Drawing Sheets

LINERLESS LABEL DISPENSING

BACKGROUND AND SUMMARY OF THE INVENTION

Most of the time when labels or tape is dispensed from a dispenser, the pressure sensitive adhesive portion of the labels or tape faces consistently in the same direction. However when using certain types of linerless labels having back to back configured labels in web form in a roll configuration (that is each label releasably connected by pressure sensitive adhesive to two other labels, in face to face engagement, and having a face on which no adhesive is provided), dispensing can be difficult. It can be very difficult to strip one label from the next without in any way damaging or deforming the labels, or causing label curl.

According to the present invention, a dispenser—and a method of dispensing labels—are provided which allow linerless labels in back to back configuration to be readily dispensed in seratim, each label readily separating from the next label, and typically without unacceptable label curl. Dispensing can be accomplished in a simple, fast, efficient, and almost fool proof manner.

According to one aspect of the present invention a dispenser for a web of labels in a roll configuration having a core is provided. The dispenser comprises: A housing having a hollow interior. A shaft for receipt of a roll of labels for mounting the roll of labels for rotation about an axis of rotation, the shaft connected to the housing. First and second substantially planar guide surfaces disposed in the housing for guiding movement of labels away from the shaft, the guide surfaces disposed in planes substantially parallel to a plane containing the axis of rotation. And, first and second arcuate surfaces adjacent the first and second guide surfaces at a portion of the housing substantially on the opposite side of the guide surfaces from the shaft, and cooperating with labels from the roll so that each label being dispensed is stripped from the following label.

Typically the guide surfaces are spaced from each other in a dimension perpendicular to the axis of rotation a distance of slightly greater than the thickness of two labels from the roll. Also, in order to prevent or minimize label curl, the arcuate surfaces preferably comprise first and second rollers rotatable with respect to the housing about axes parallel to the axis of rotation of the roll of labels. Each of the rollers may comprise a stationary aluminum rod mounted to the housing and a free wheeling thin plastic tube disposed over the rod, having a larger internal diameter than the outer diameter of the rod.

The dispenser also comprises means for maintaining the labels being dispensed from the roll taut to provide rigidity and assist stripping of each label being dispensed from the following label. The means for maintaining it taut may comprise a ribbed external surface of the shaft (the ribs of the shaft surface for engaging an inner core of the roll) or a substantially circular in cross-section brush defining the shaft.

The housing may be CNC machined out of a clear acrylic or plexiglass material, or the like, or may injection molded out of a polycarbonate plastic, an ABS plastic, or the like. The housing typically comprises a bottom wall, two side walls extending in planes substantially parallel to a plane containing the axis of rotation and substantially perpendicular to the bottom wall; a first end wall supporting the shaft and disposed in a plane substantially perpendicular to the axis of rotation of a roll mounted by the shaft; and first and second upper walls slanted from the side walls at an angle thereto, away from the shaft, the upper walls meeting in an imaginary peak line, and the rollers disposed adjacent, and substantially parallel to, the imaginary peak line The housing may have a second end opposite the first end wall, the second being substantially open so as to allow ready movement of a label roll core over or off of the shaft.

According to another aspect of the present invention a dispenser for a web of labels in a roll configuration having a core is provided comprising the following elements: A housing having a hollow interior. A shaft for receipt of the core a roll of labels for mounting the roll of labels for rotation about an axis of rotation, the shaft connected to the housing. And, first and second break over rollers rotatable with respect to the housing about axes parallel to the axis of rotation of the roll of labels, at a portion of the housing substantially on the opposite side of the guide surfaces from the shaft, and cooperating with labels from the roll so that each label being dispensed is stripped from the following label, and with minimum label curl.

The invention also comprises a method of dispensing linerless quadrate pressure sensitive adhesive labels provided in a web in a roll configuration, each label releasably connected by pressure sensitive adhesive to two other labels, in face-to-face engagement, and having a face on which no adhesive is provided; and using a dispenser having a shaft for mounting the roll for rotation about an axis of rotation, and a pair of break over rollers at an exit end of the dispenser, the rollers rotatable about axes parallel to the roll axis of rotation and spaced from each other a distance slightly greater than the maximum thickness of two face-to-face engagement labels from the roll. The method comprises the following steps: (a) Mounting the roll on the shaft for rotation about the axis of rotation. (b) Pulling the leading edge of the web of labels away from the labels and positioning it between the rollers. (c) Grasping the leading edge of the leading label on the opposite side of the rollers from the shaft and while pulling the leading label away from the shaft, pulling the leading label back over the first roller, which is closest to its face, so as to cause the leading label to strip away from the next label, until the leading label is completely stripped away from the next label. (d) Pulling the next label away from the shaft, and while doing so pulling the next label back over the second roller, which is closest to its face, so as to cause the next label to strip away from the label following it, until it is completely stripped away from the label following it. AM, (e) repeating steps (c) and (d) for each subsequent label until substantially the entire roll has been dispensed.

There is typically the further step (f) of substantially linearly guiding the labels as they are pulled away from the shaft just prior to engagement with the rollers. There may also be the further step of mounting the dispenser so that the roller axes are horizontal, and so that the labels move upwardly away from the shaft. In that case step (f) is practiced by guiding the labels so that they move vertically before engaging the rollers. There may also be the further step, after (e), of placing a new roll in the dispenser and repeating steps (a) through (e).

It is the primary object of the present invention to provide a simple yet efficient dispenser, particularly for dispensing linerless back to back labels, as well as a method of dispensing those labels. This and other objects of the invention will become clear from an inspection of the detailed description of the invention and from the appended claims.

DETAILED DESCRIPTION OF THE DRAWINGS

Figure 5:
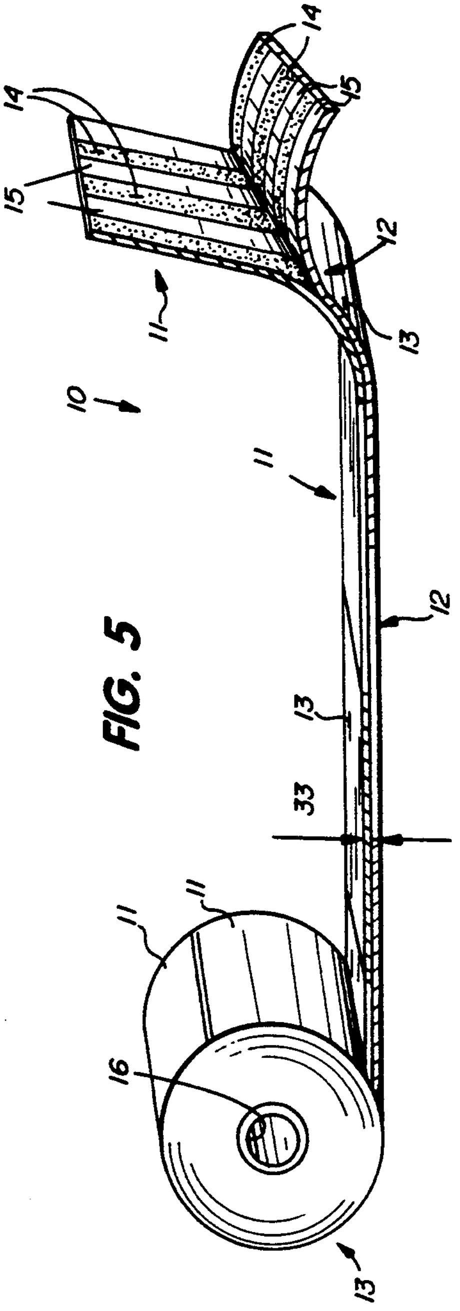
FIG. 5 is a perspective view of a roll of a back to back linerless label web that is dispensed according to the present invention.

FIGS. 1 through 4 show the sequential action in the practice of a method of detaching linerless labels, one at a time, from a web of linerless labels in back to back configuration, in a roll, according to the present invention. FIG. 5 shows the labels that are ideally used with dispenser of FIGS. 1 through 4. As seen in FIG. 5, a web 10 of individual labels 11, 12 is provided, the web 10 having a roll configuration 13 and the individual labels 11, 12—which are typically quadrate (e.g. rectangular) in configuration—are dispensed from the roll 13. Each of the labels 11, 12 has one face 13 thereof on which there is no pressure sensitive adhesive; typically printing, or a surface for receipt of printing or writing, defines the face 13. Opposite the face 13 is a face containing alternate strips of pressure sensitive adhesive 14 and silicone release material 15. The pressure sensitive adhesive may be any suitable type, typically permanent, but it also may be removable adhesive, or a repositional adhesive, such as sold by Moore Business Forms, Inc. of Lake Forest, Ill. under the trademark "Cleantac". The pressure sensitive adhesive strips 14 of one label 11 engage the release material strips 15 of the facing labels 11, as seen in FIG. 5 and as disclosed in U.S. Pat. No. 3,312,005 (incorporated by reference herein). For clarity of illustration the strips 15 are not shown in FIGS. 2–4. Thus the pressure sensitive adhesive 14-containing faces are in face to face engagement and overlap each other, each label 11 being connected to two labels 12 except for the leading label (right hand most label 11 in FIG. 5). The roll 13 has a core 16 to mount the roll 13 for rotation about an axis.

FIGS. 1 through 4 illustrate a dispenser 18 that is utilized according to the present invention. The dispenser comprises a housing, shown generally by reference numeral 19, having a shaft 20 mounted to it, within the hollow interior 21 thereof. The shaft 20 has an external diameter comparable to the internal diameter of the core 16 of the roll 13 and mounts the roll 13 for rotation about an axis 21.

Figures 1, 2, 3, 4:
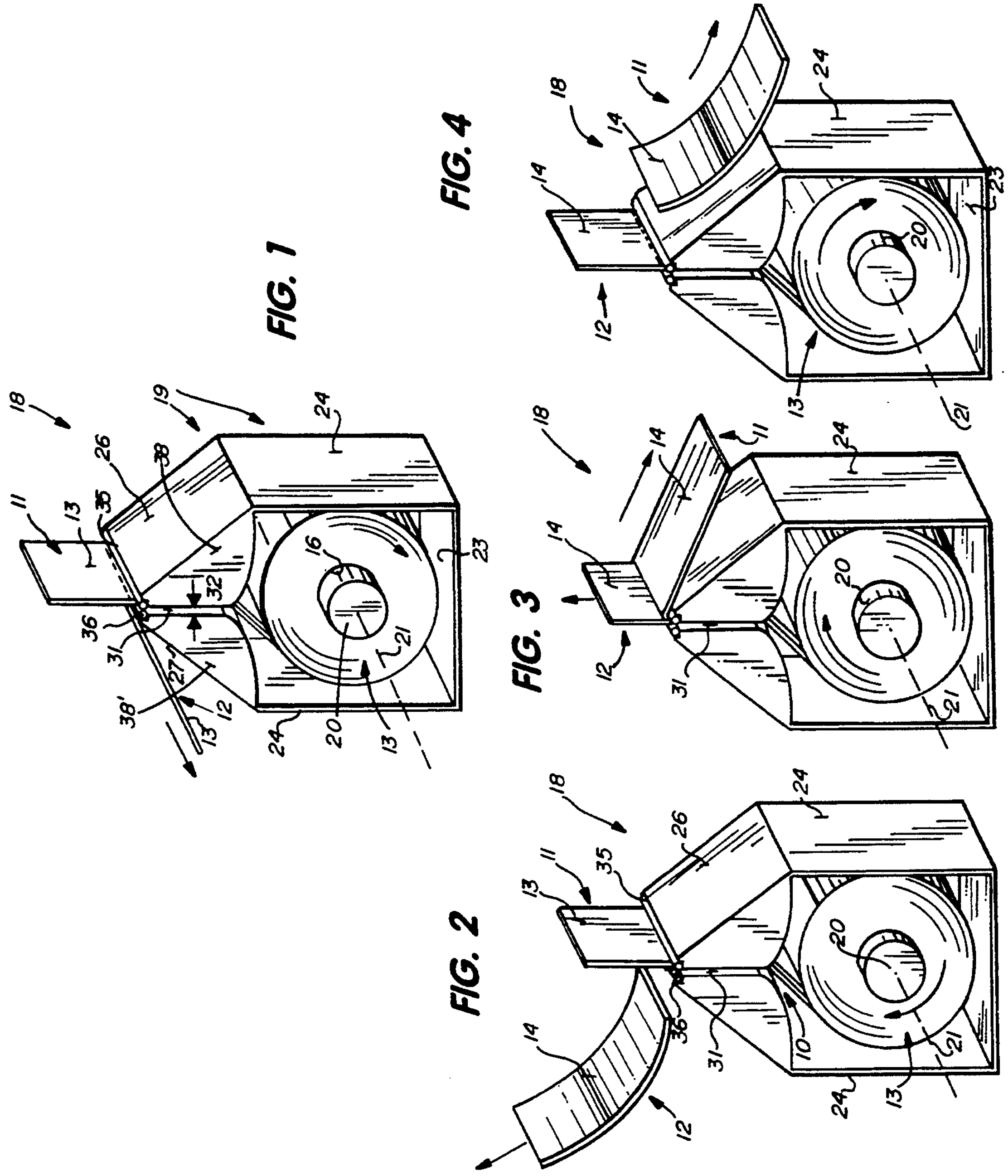
FIG. 1 is a perspective view of an exemplary embodiment of the dispenser of back to back linerless labels according to the present invention, with a roll of labels mounted therein.
FIGS. 2 through 4 are views like that of FIG. 1 only showing different sequential steps in dispensing labels from the roll within the dispenser.
Figure 6:
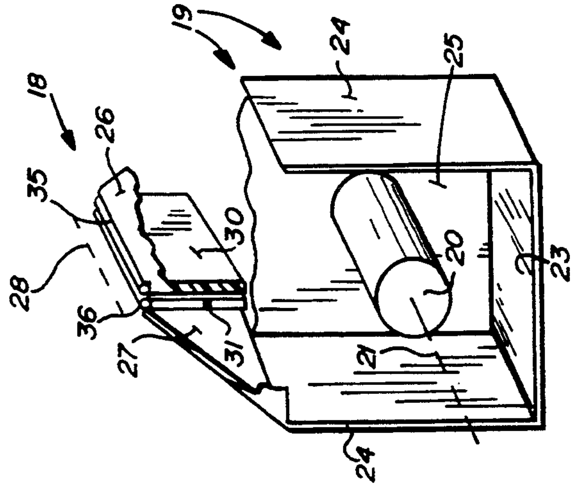
FIG. 6 is a view like that of FIG. 1 only with the label roll removed and with a portion of the dispenser housing cut away for clarity of illustration.

As seen, for example, in FIGS. 1 and 6, the housing 18 includes a bottom wall 23, two side walls 24 extending in a plane substantially parallel to a plane containing the axis of rotation 21 and substantially perpendicular to the bottom wall 23, and a first end wall 25, the end wall 25 supporting the shaft 20 in a cantilever manner. The shaft 20 is stationary with respect to the end wall 25. While it is not essential, in the preferred embodiment illustrated in the drawings (e.g. FIGS. 1 and 6) a second end of the housing 19 is provided, opposite the end wall 25, the second end being primarily open so as to allow ready insertion and replacement and removal of rolls 13 of linerless labels to be dispensed.

The housing 19 further comprises first and second upper walls 26, 27 slanted from the side walls 24 at an angle thereto, away from the shaft 20. The upper walls 26, 27 meet in an imaginary peak line 28 (see FIG. 6).

The dispenser 18 also preferably comprises first and second substantially planar guide surfaces 30, 31, seen in most clearly in FIG. 6. The guide surfaces 30, 31 are spaced apart a distance 32 (see FIG. 1) which is slightly greater than the thickness 33 of the web 10 (see FIG. 5), that is slightly greater than the thickness of two labels 11, 12. The surfaces 30, 31 guide the labels 11, 12 linearly (e.g. vertically) a short distance to retain stability in the labels and to provide easier separation of one label from the next. For example, the surfaces 30, 31 may provide a guide distance that is roughly 25 to 60% the length of a label 11, 12.

Finally the dispenser 18 comprises arcuate surfaces at the far end of each of the guide surfaces 30, 31 opposite the shaft 20. Preferably the arcuate surfaces comprise first and second rollers 35, 36 (see FIG. 6) which are mounted for rotation about axes parallel to the axis 21, and on opposite sides of a plane container the axis 21 and passing between the surfaces 30, 31 While an arcuate surface alone, which has a sufficiently small diameter compared to the length of the label 11, 12, can provide a desirable stripping action to allow detachment of one label from the next, rotation, such as provided by roller, minimizes label curl and thus is highly desirable. Note that the labels 35, 36 have a diameter that is only a small fraction of the length of each of the labels 11, 12.

The housing 19 mounts the rollers 35, 36 for rotation above the axes thereof. Typically, the end wall 25 provides one surface for mounting the rollers 35, 36, while the other surface may comprise a continuous or split upper end wall portion, shown by reference numerals 38, 38' in FIG. 1. The upper end wall portion 38, opposite the end wall 25, mounts one end of the roller 35 while the other upper end wall portion 38' mounts the roller 36.

Figure 7:
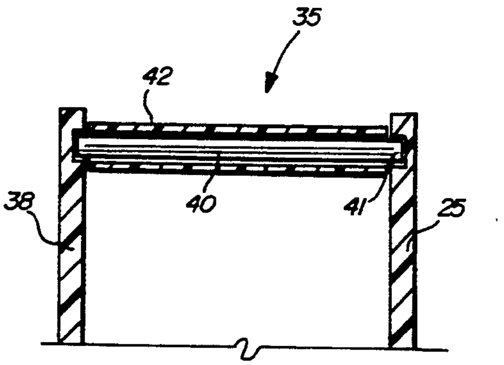
FIG. 7 is a cross-sectional view, partly in elevation, showing an exemplary roller according to the present invention.

FIG. 7 illustrates schematically one exemplary manner in which a roller may be mounted, in this case the roller 35 being illustrated, although the mounting for the roller 36 is substantially identical. In this case, the roller 35 is defined by a rod 40, such as an aluminum rod, which is stationarily mounted (e.g. in recesses in the walls 25, 38, only one such recess 41 being seen in FIG. 7) so that the rod 40 does not significantly rotate with respect to the housing 19, including the housing components 25, 38. Disposed surrounding the rod 40 is a free wheeling tube 42, preferably of thin plastic, having a slightly larger internal diameter than the outer diameter of the rod 40.

Figure 8:
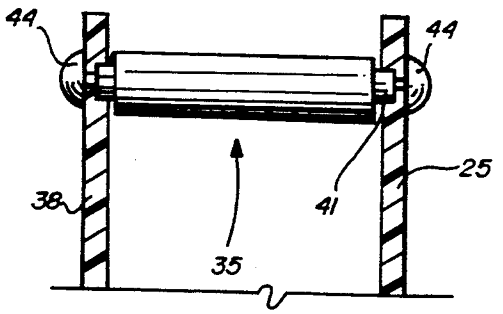
FIGS. 8 and 9 are views similar to that of FIG. 7 showing slightly different mechanisms for mounting the roller and FIG. 9 showing in dotted line bending of the housing walls to facilitate snap-in of the stationary rod of the roller.
Figure 9:
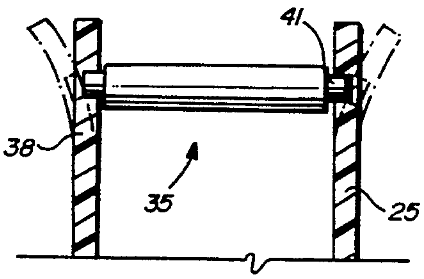

Other mechanisms for mounting the rollers can also be provided, although typically bearings are not utilized since they are more complex than is necessary for the dispenser 18 according to the invention. FIG. 8 illustrates a roller 35 identical to the roller of FIG. 7 except that instead of recesses, such as the recess 41, being provided for mounting the roller 35, fasteners 44 extend into opposite ends of the rod 41 for mounting it to the housing components 25, 38. In FIG. 9 the roller 35 is mounted substantially identically to the roller 35 in FIG. 7, except for the fact that the housing components 25, 38 are resilient, and can be bent outwardly—as indicated by dotted line in FIG. 9—to allow the rod 41 to snap in place.

The housing 18 may be made from a wide variety of materials. For example if it is made by a CNC machine (a computer driven milling machine) in which the housing is carved out of plastic, it may be constructed from a clear acrylic or plexiglass material, or a similar material. If the housing 19 is injection molded, then it could be constructed out of a polycarbonate plastic, an ABS plastic, or the like. The FIG. 8 construction for mounting the roller 35 is typically used if the housing 19 is CNC manufactured, however if the housing is molded then the construction of FIGS. 7 or 9 is more desirable.

Before describing other housing embodiments, the method of dispensing of the labels 11, 12 utilizing the dispenser 18 will be described with specific reference to FIGS. 1 through 4.

The roll 13 is initially loaded into the housing 19 through the open end thereof, the core 16 being provided over the shaft 20, and the web 10 being slid sideways through the spacing 32 between the guide surfaces 30, 31, and the corresponding spacing between the rollers 35, 36. Then the user pulls on the label 12—the leading label in FIG. 1—to move it away from the shaft 20, and at the same time breaking the label 12 over the roller 36—the roller closest to the face 13 of the label 12—so as to cause the leading label 12 to strip away from the next label 11. This action is continued until—as illustrated in FIG. 1—the leading label is completely stripped away from the next label 11, the label 12 having the pressure sensitive (e.g. repositional) adhesive 14 thereof applied to any desired object. Then when it is desired to dispense the next label 11, that label is grasped and—as illustrated in FIG. 3—it is pulled away from the shaft 20 while at the same time the face 13 thereof—which is the face closest to the break over roller 35—is pulled back over the break over roller 35 until it is completely stripped away from the next label 12. During this time, since the labels 11, 12 are being guided by the walls 30, 31 they are stabilized to facilitate the stripping action, that is the label 12 being held somewhat rigidly by the guide surfaces 30, 31 as the label 11 is being pulled in the manner illustrated in FIG. 3. This pulling action is continued until, as illustrated in FIG. 4, the leading label 11 is completely stripped away from the next label 12. Note that inherently as the label 11 is being pulled in the manner illustrated in FIG. 3 it causes the label 12 trailing it to move upwardly away from the shaft 20 (compare FIGS. 3 and 4) until the adhesive surfaces 14 are completely detached from each other (FIG. 4). Thus dispensing is smooth, easy, and sure.

Once all of the labels 11, 12 in a roll 13 have been dispensed, if the roll 13 has a solid core 16 that core is removed from the shaft 20 and then a new roll 13 is put in its place. If no solid core is provided, then the next roll 13 is merely is put into place.

In the preferred method according to the present invention, the dispenser 18 is mounted/positioned so that the bottom wall 23 thereof is in fact the bottom wall, and so that the labels 11, 12 are dispensed vertically upwardly (that is the true orientation illustrated in FIGS. 1 through 4).

Figure 11:
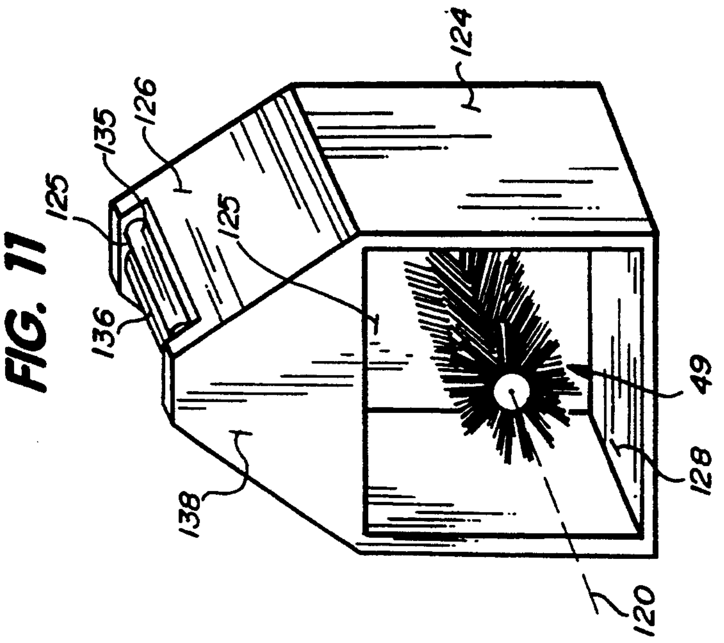
FIG. 11 is a view like that of FIG. 10 only showing a different shaft configuration of the dispenser.
Figure 10:
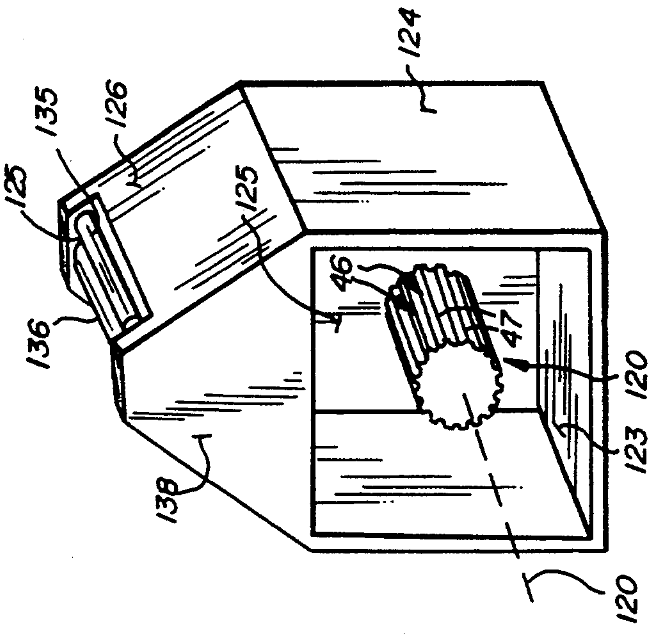
FIG. 10 is a view like that of FIG. 6 only with a slightly modified configuration of the housing, shaft, and rollers.

FIGS. 10 and 11 illustrate slightly different embodiments from the embodiment illustrated in FIGS. 1 through 4 and six. In the FIGS. 10 and 11 embodiments components comparable to those in the FIGS. 1 through 4 and 6 embodiment are shown by the same reference numeral only preceded by a "1".

The major distinction between the FIG. 10 and the FIG. 6 embodiments is that in the FIG. 10 embodiment means are provided for maintaining the labels 11, 12 being dispensed from the roll 13 taut to provide rigidity and assist stripping of each label being dispensed from the following label. The label web 10 is maintained taut by providing tension. Tension is typically maintained by making it difficult (although still possible considering the tear strength of the labels 11, 12) to rotate the roll 13 about the axis 21, such as by providing friction between the core 16 and the shaft 120. This is accomplished in FIG. 10 by making the shaft 120 so that it has a ribbed external surface 46. The ribs 47 of the ribbed surface 46 (the outer circumferential surface of the shaft 120) tightly engage the interior of the core 16 so that friction is applied and rotation (as indicated by the arcuate arrows in FIGS. 1 through 4) is difficult, providing tension to the web 10 as it is being dispensed.

FIG. 10 also has a few minor other variations compared to the embodiment of FIG. 6. In FIG. 10, the upper end wall portion 138 is solid rather than having the spacing 32 therein, so the lead end of the web 10 must be threaded up between the guide surfaces mounted interior of the housing (not visible in FIG. 10). Also in this embodiment, the upper end wall portion 138 and the end wall 125 extend upwardly a greater distance above the rollers 135, 136 than do the components 25, 36 in the FIG. 6 embodiment.

FIG. 11 is identical to FIG. 10 except for the construction of the shaft. Instead of the shaft 120 with the ribs 47 on the ribbed circumferential surface 46 thereof, the shaft is in the form of a substantially circular in cross-section brush 49 defining the shaft. The brush 49 preferably has synthetic material bristles that are stiff and thus also—like the ribs 47—provide friction with the interior of the core 16, causing tension on the web 10 as it is pulled upwardly between the rollers 135, 136.

It will thus be seen that according to the present invention an advantages dispenser for a web of linerless labels, and a method of dispensing linerless labels have been provided. While the invention has been herein shown and described in what is presently conceived to be the most practical and preferred embodiment thereof it will be apparent to those of ordinary skill in the art that many modifications may be made thereof within the scope of the invention which scope is to be accorded the broadest interpretation of the appended claims so as to encompass all equivalent structures and methods.

What is claimed is:

1. A dispenser for a web of labels in a roll configuration having a core, comprising:

a housing having a hollow interior;

a shaft for receipt of a roll of labels for mounting the roll of labels for rotation about an axis of rotation, said shaft connected to said housing;

first and second substantially planar guide surfaces disposed in said housing for guiding movement of labels away from said shaft, said guide surfaces disposed in planes substantially parallel to a plane containing said axis of rotation; and first and second arcuate surfaces adjacent said first and second guide surfaces at a portion of said housing substantially on the opposite side of said guide surfaces from said shaft, and cooperating with labels from the roll so that each label being dispensed is stripped from the following label.

2. A dispenser as recited in claim 1 wherein said guide surfaces are spaced from each other in a dimension perpendicular to said axis of rotation a distance of slightly greater than the thickness of two labels from the roll.

3. A dispenser as recited in claim 1 wherein said arcuate surfaces comprise first and second rollers rotatable with respect to said housing about axes parallel to said axis of rotation of the roll of labels.

4. A dispenser as recited in claim 3 wherein each of said rollers comprises a stationary rod mounted to said housing, and a free-wheeling tube having a larger internal diameter than the outer diameter of said rod mounted on said rod.

5. A dispenser as recited in claim 4 further comprising means for maintaining the labels being dispensed from the roll taut to provide rigidity and assist stripping of each label being dispensed from a following label.

6. A dispenser as recited in claim 5 wherein said means for maintaining the labels taut comprises a ribbed external surface of said shalt, the ribs of said shaft surface for engaging the core of the roll.

7. A dispenser as recited in claim 5 wherein said means for maintaining the labels taut comprises a substantially circular in cross-section brush defining said shaft.

8. A dispenser as recited in claim 3 wherein said housing comprises a bottom wall, two side walls extending in planes substantially parallel to a plane containing said axis of rotation and substantially perpendicular to said bottom wall; a first end wall supporting said shaft and disposed in a plane substantially perpendicular to said axis of rotation of a roll mounted by said shaft; and first and second upper walls slanted from said side walls at an angle thereto, away from said shaft, said upper walls meeting in an imaginary peak line, and said rollers disposed adjacent, and substantially parallel to, the imaginary peak line.

9. A dispenser as recited in claim 8 wherein said housing has a second end opposite said first end wall, said second end being substantially open so as to allow ready movement of a label roll core over or off of said shaft.

10. A dispenser as recited in claim 8 wherein said housing is made of clear acrylic, plexiglass, polycarbonate plastic, or ABS plastic.

11. A dispenser as recited in claim 1 in combination with a web of linerless quadrate pressure sensitive adhesive labels provided in a roll configuration, with each label releasably connected by pressure sensitive adhesive to two other labels, in fact to face engagement, and having a face on which no adhesive is provided, the web being disposed so that it extends between the guide surfaces and the acurate surfaces with the non-adhesive faces of the labels being consecutively movable into contact with the first and second arcuate surfaces.

12. A dispenser for a web of labels in a roll configuration having a core, comprising:

a housing having a hollow interior;

a shaft for receipt of the core a roll of labels for mounting the roll of labels for rotation about an axis of rotation, said shaft connected to said housing; and first and second break over rollers rotatable with respect to said housing about axes parallel to said axis of rotation of the roll of labels, at a portion of said housing substantially on the opposite side of said guide surfaces from said shaft, and cooperating with labels from the roll so that each label being dispensed is stripped from the following label, and with minimum label curl.

13. A dispenser as recited in claim 12 wherein said rollers are spaced from each other in a dimension perpendicular to said axis of rotation of the roll of labels a distance of slightly greater than the thickness of two labels from the roll.

14. A dispenser as recited in claim 12 wherein each of said rollers comprises a stationary rod mounted to said housing, and a free-wheeling tube having a larger internal diameter than the outer diameter of said rod mounted on said rod.

15. A dispenser as recited in claim 12 further comprising means for maintaining the labels being dispensed from the roll taut to provide rigidity and assist stripping of each label being dispensed from a following label.

16. A dispenser as recited in claim 15 wherein said means for maintaining the labels taut comprises a ribbed external surface of said shaft, the ribs of said shaft surface for engaging the core of the roll, or a substantially circular in cross-section brush defining said shaft.

17. A dispenser as recited in claim 12 wherein said housing comprises a bottom wall, two side walls extending in planes substantially parallel to a plane containing said axis of rotation and substantially perpendicular to said bottom wall; a first end wall supporting said shaft and disposed in a plane substantially perpendicular to said axis of rotation of a roll mounted by said shaft; and first and second upper walls slanted from said side walls at an angle thereto, away from said shaft, said upper walls meeting in an imaginary peak line, and said rollers disposed adjacent, and substantially parallel to, the imaginary peak line.

18. A method of dispensing linerless quadrate pressure sensitive adhesive labels provided in a web in a roll configuration, each label releasably connected by pressure sensitive adhesive to two other labels, in face-to-face engagement, and having a face on which no adhesive is provided: and using a dispenser having a shaft for mounting the roll for rotation about an axis of rotation, and a pair of break over rollers at an exit end of the dispenser, the rollers rotatable about axes parallel to the roll axis of rotation and spaced from each other a distance slightly greater than the maximum thickness of two face-to-face engagement labels from the roll, said method comprising the steps of:

(a) mounting the roll on the shaft for rotation about the axis of rotation;

(b) pulling the leading edge of the web of labels away from the labels and positioning it between the rollers;

(c) grasping the leading edge of the leading label on the opposite side of the rollers from the shaft and while pulling the leading label away from the shaft, pulling the leading label back over the first roller, which is closest to its face, so as to cause the leading label to strip away from the next label, until the leading label is completely stripped away from the next label;

(d) pulling the next label away from the shaft, and while doing so pulling the next label back over the second roller, which is closest to its face, so as to cause the next label to strip away from the label following it, until it is completely stripped away from the label following it; and (e) repeating steps (c) and (d) for each subsequent label until substantially the entire roll has been dispensed.

19. A method as recited in claim 18 comprising the further step, after step (e), of placing a new roll in the dispenser, and repeating steps (a)-(e).

20. A method as recited in claim 18 comprising the further step (f) of substantially linearly guiding the labels as they are pulled away from the shaft just prior to engagement with the rollers.

21. A method as recited in claim 20 comprising the further step of mounting the dispenser so that the roller axes are horizontal and so that the labels move upwardly away from the shaft, and wherein step (f) is practiced by guiding the labels so that they move vertically before engaging the rollers.

* * * * *